United States Patent [19]

Forster et al.

[11] B 3,914,653

[45] Oct. 21, 1975

[54] VOLTAGE REGULATOR FOR DEFLECTION CIRCUIT

[75] Inventors: Gerhard Forster, Wuerenlos; Hans Keller, Horgen, both of Switzerland

[73] Assignee: RCA Corporation, New York, N.Y.

[22] Filed: May 14, 1973

[21] Appl. No.: 359,947

[44] Published under the Trial Voluntary Protest Program on January 28, 1975 as document no. B 359,947.

[30] Foreign Application Priority Data

May 18, 1972 United Kingdom.............. 23542/72

[52] U.S. Cl. ................ 315/389; 315/411; 315/403

[51] Int. Cl.$^2$ ........................................ H01J 29/70

[58] Field of Search ......... 315/27 R, 27 TD, 28, 29, 315/26, 20, 403, 389, 411, 387

[56] References Cited

UNITED STATES PATENTS

| | | | |
|---|---|---|---|
| 3,351,804 | 11/1967 | Kongable et al. | 315/20 |
| 3,535,445 | 10/1970 | Griffery | 315/20 |
| 3,767,960 | 10/1973 | Ahrens | 315/27 TD |

*Primary Examiner*—Malcolm F. Hubler
*Assistant Examiner*—J. M. Potenza
*Attorney, Agent, or Firm*—E. M. Whitacre; Rasmussen P. J.

[57] ABSTRACT

A controllable phase shifting network is coupled between a source of direct current and an inductance coupling direct current energy to a commutating network including a commutating switch of a retrace driven deflection circuit. The phase shifting network oscillates due to the operation of the commutating switch and modulates the direct current applied to the commutating network such that the peak voltage across the commutating switch in its open condition is reduced. Regulation against undesirable voltage variations in the deflection circuit is achieved by varying the reactance of the phase shifting network in response to voltage variations obtained from the deflection circuit.

8 Claims, 7 Drawing Figures

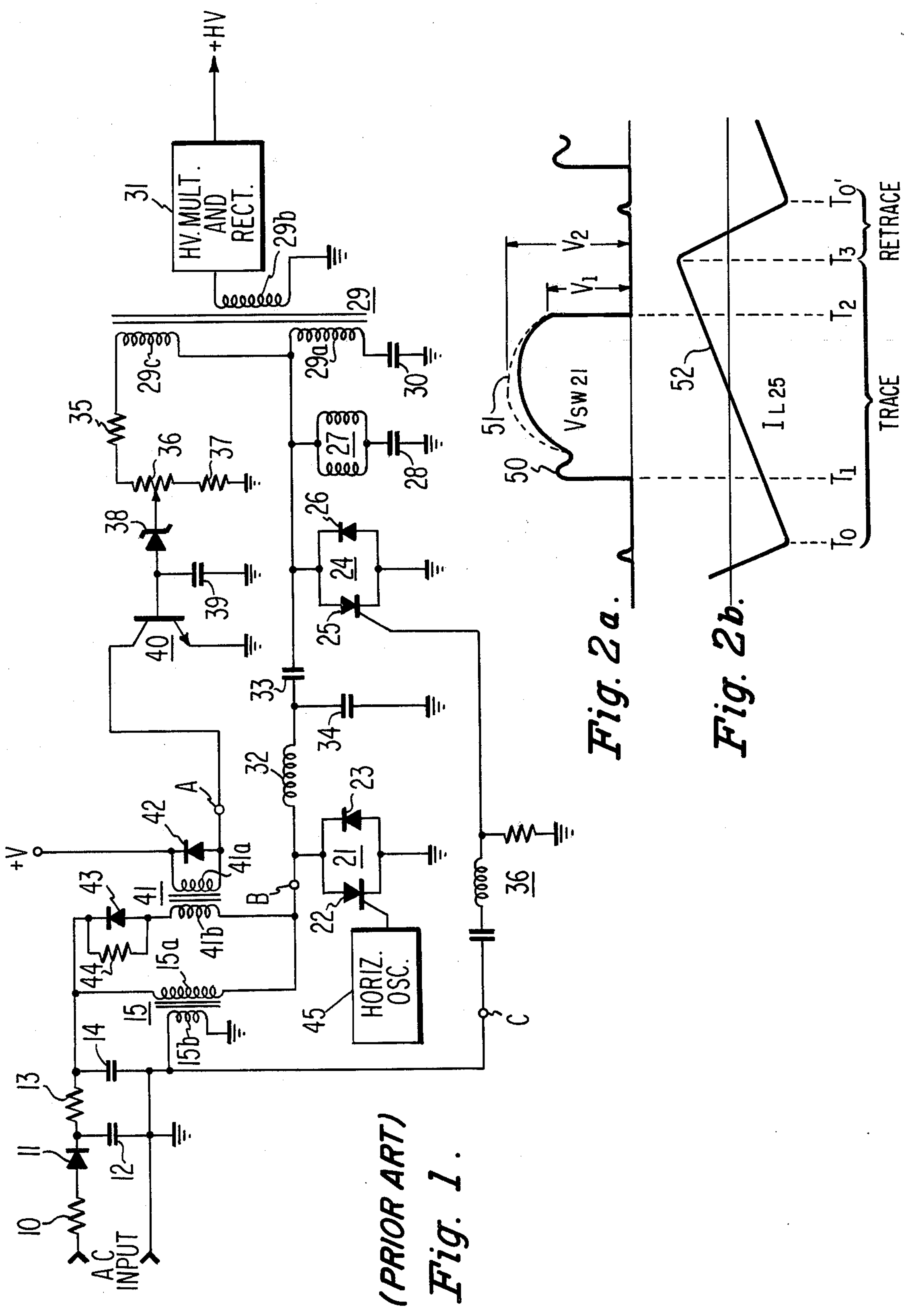
(PRIOR ART) Fig. 1. Fig. 2a. Fig. 2b.

VOLTAGE REGULATOR FOR DEFLECTION CIRCUIT

BACKGROUND OF THE INVENTION

This invention relates to regulator circuits for use with deflection systems. It is desirable to regulate the operating supply voltage of the horizontal deflection circuit of a television receiver in order to supply constant energy to the horizontal deflection winding from one deflection cycle to another. Variations in the supply voltage change the amount of scanning current in the deflection winding and result in undesirable picture width variations. Additionally it is customary to derive the ultor voltage for the picture tube from the horizontal deflection circuit by rectifying the flyback pulses produced in the horizontal output transformer during the retrace interval of each deflection interval. A variation of the supply voltage will vary the flyback pulse energy and hence the ultor voltage, resulting in picture brightness variation and a further variation in picture width. Furthermore, operating voltages for other portions of the receiver, such as the video or audio stages, may also be derived from the horizontal deflection circuit, and it is desirable that these voltages also be regulated. Of course, it is known that separate voltage regulators may be utilized for the deflection and other circuits, but such an approach is costly and increases the complexity of the receiver.

In a horizontal deflection system such as disclosed in U.S. Pat. No. 3,452,244 issued June 24, 1969, to W. F. W. Dietz and entitled, "Electron Beam Deflection and High Voltage Generation Circuit," two bidirectionally conducting switches serve to respectively commutate energy in the circuit and provide scanning current to a horizontal deflection winding. Each switch comprises a silicon controlled rectifier (SCR) and an oppositely poled diode connected in parallel therewith. Due to the reactive components connected in circuit with these switches, there are relatively high voltages appearing across these switches when they are open during each deflection cycle. The voltage across the commutating switch is greater than across the trace switch. Furthermore, in the Dietz type system the peak voltage across the commutating switch does not occur at the instant of switching but at some other time during its open condition. This peak voltage across the switch stresses the SCR and it must be made to withstand breakdown under peak high voltage conditions. It follows that the SCR devices utilized in the deflection system could be made less expensive and deflection system reliability could be increased if the unnecessarily high peak voltage across the devices could be reduced in a given circuit.

In accordance with the invention a voltage regulator for a deflection system including a commutating switch for causing a transfer of energy to a commutating network during a first portion of each deflection cycle for supplying scanning current to a deflection winding during a second portion of each deflection cycle is provided. A first inductance means is coupled to the commutating switch. A second variable inductance means is coupled to the first inductance means and to a source of direct current voltage. Capacitance means are coupled in circuit with the second inductance means for forming a resonant circuit therewith for coupling energy from the DC source to the first inductance means as the commutating switch operates during each deflection cycle. Means responsive to a source of undesirable voltage variations in the deflection system are coupled to the second inductance means to vary its inductance and hence its resonant frequency for varying the phase of the energy coupled to the first inductance means for maintaining substantially constant energy in the commutation network from one deflection cycle to another.

A more detailed description of the invention is given in the following detailed description and accompanying drawings of which:

FIG. 1 is a circuit diagram of a prior art deflection system including a regulator circuit;

FIGS. 2*a* and 2*b* are diagrams illustrating waveforms obtained in the circuit of FIG. 1;

DESCRIPTION OF THE INVENTION

Figure 3:
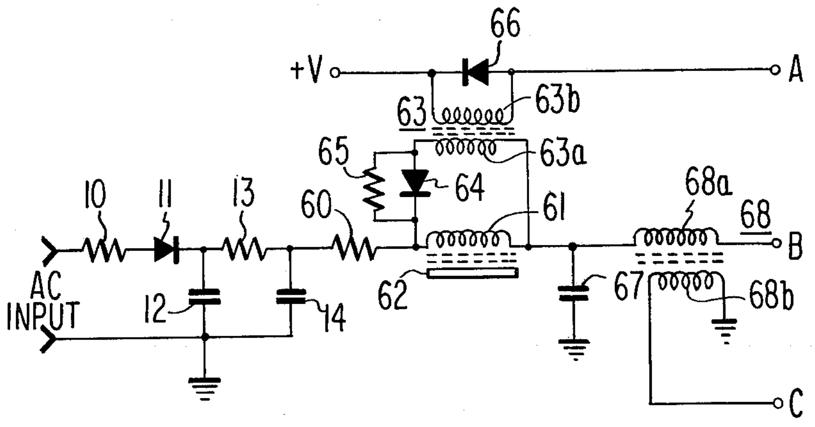
FIG. 3 is a regulator circuit embodying the invention which is useful in conjunction with the deflection system of FIG. 1.

FIG. 1 is a circuit diagram of a prior art deflection system 10 similar to that disclosed in U.S. Pat. No. 3,452,244. This circuit includes a commutating switch 21, comprising a silicon controlled rectifier (SCR) 22 and an oppositely poled damper diode 23 coupled between the junction of a winding 15*a* of an input choke 15 and a winding 41*b* of a saturable reactor 41 and ground. The other terminal of winding 15*a* is connected to a source of positive direct current voltage obtained from a power supply including a current limiting resistor 10, a rectifying diode 11, a filter capacitor 12, a smoothing resistor 13 and a second filtering capacitor 14. Commutating switch 21 is coupled through a commutating coil 32 and a capacitor 33 to a trace switch 24. Trace switch 24 comprises an SCR 25 and an oppositely poled damper diode 26. A capacitor 34 is coupled between the junction of coil 32 and capacitor 33 and ground. Trace switch 24 is coupled through the series combination of a horizontal deflection winding 27 and an S-shaping capacitor 28 to ground, and through a primary winding 29*a* of a horizontal output transformer 29 and a DC blocking capacitor 30 to ground.

A secondary, or high voltage, winding 29*b* of transformer 29 produces relatively large amplitude flyback pulses during the retrace interval of each deflection cycle. These pulses are applied to a high voltage multiplier and rectifier circuit 31 for producing a direct current high voltage in the order of 27 kilovolts for use as the ultor voltage of a television picture tube (not shown).

A horizontal oscillator 45 is coupled to the gate electrode of commutating SCR 22 and produces a pulse during each deflection cycle slightly before the end of the trace interval to turn on SCR 22 to initiate the commutating interval. A waveshaping network 36 is coupled between a winding 15*b* of the input choke 15 and the gate electrode of trace SCR 25 for enabling SCR 25 for conduction during the second half of the trace interval.

A winding 29*c* of horizontal output transformer 29 is coupled through a voltage divider consisting of series connected resistor 35, potentiometer 36 and resistor 37 to ground. The wiper arm of potentiometer 36 is coupled through a zener diode 38 to the base electrode of a regulator transistor 40. A capacitor 39, which is chosen of large enough value to render capacitance changes in zener diode 38 from one receiver to another insignificant, is coupled from the base of transistor 40 to ground. The emitter of transistor 40 is grounded and the collector is coupled through a central winding 41*a* of a saturable reactor 41 to a source of positive voltage +V. An energy recovery diode 42 is coupled in parallel with winding 41*a*.

A winding 41*b* of saturable reactor 41 is coupled in parallel with the input inductor winding 15*a* through the parallel combination of resistor 44 and energy recovery diode 43.

At the beginning of the trace interval, the deflection current, illustrated by waveform 52 of FIG. 2*b*, in deflection winding 27 is at a maximum negative amplitude at time $T_O$ and is linearly decreasing as current is conducted through diode 26 and winding 27 to charge capacitor 28. About the middle of the trace interval the deflection current goes through zero and reverses; damper diode 26 is now cut off and SCR 25, which had been enabled during the first half of trace by a positive gate pulse from wave-shaping network 36, now conducts, providing a path to ground through winding 27 for energy stored in capacitor 28, which capacitor 28 also serves as an S-shaping capacitor. It should be noted that the average voltage across capacitor 28 is in the order of 20–70 volts depending on whether the circuit is used in a black and white or color receiver and the capacitor is large enough such that during each deflection cycle it charges and discharges only partly about the nominal average charge.

During the trace interval commutating switch 21 is open, and capacitors 33 and 34 are charged in parallel through commutating coil 22 by the energy stored in winding 15*a* of input choke 15. Slightly before the end of trace a positive gate from horizontal oscillator 45 enables SCR 22 and it starts to conduct, initiating the commutating interval. At this time first and second resonant circuits are formed; the first comprising SCR 22, coil 32 and capacitor 34, and the second comprising SCR 22, coil 32, capacitor 33 and SCR 25 which now conducts current in two directions.

The resonant current through SCR 25 from capacitor 33 increases more rapidly than the increasing deflection current and when the former exceeds the latter SCR 25 is turned off. At this time the current switches to diode 26, but when the resonant current from capacitor 33 reverses, diode 26 is switched off, disconnecting the deflection current path, ending the trace interval at time $T_3$ and initiating the retrace interval. During the retrace interval, which is totally included within the commutating interval, which occurs from time $T_2$ in one deflection interval to $T_1$ in the next deflection cycle interval, energy is supplied through switch 21, coil 32 and capacitors 33 and 34 through the deflection winding 27 to replenish the charge on capacitor 28, and from switch 21, coil 32 and capacitors 33 and 34 to replenish the energy in the primary winding 29*a* of horizontal output transformer 29.

During the energy exchange retrace interval SCR 22 and diode 23 are rendered nonconducting as the resonating voltage in turn reverse biases each device, opening switch 21. Also, as the resonating current decreases the reverse bias across diode 23, it again conducts, initiating the next trace interval.

The commutating interval ends at time $T_1$ shortly after the beginning of the trace interval as the currents in capacitors 33 and 34 approach zero and diode 23, which had been conducting for a second time during the commutating interval, is cut off. During the commutating interval when switch 21 was closed winding 15*a* was placed between the source of operating potential and ground and hence conducted a linearly increasing current. At the end of the commutating interval, when switch 21 opens, the energy stored in winding 15*a* again charges capacitors 33 and 34 in preparation for the next commutating interval.

Regulation of the circuit occurs as follows. Assuming an increase in voltage from the power supply providing operating current to input choke 15*a*, there will be an increase of energy transferred to capacitors 33 and 34. There will then be increased energy provided to the deflection winding 27 and the primary winding 29*a* of transformer 29. The retrace pulse will then be of a greater amplitude with a corresponding undesirable increase in the high voltage ultor potential.

The retrace pulse developed across winding 29*c* will be of a greater positive level. This will cause current amplifier 40 in the regulator stage to conduct more current through control winding 41*a* of saturable reactor 41. This greater current through winding 41*a* decreases the inductance of winding 41*b* and, therefore, the inductance of the parallel combination of winding 41*b* and input inductance winding 15*a*. The decreased inductance causes the voltage across the open commutating switch 21 to increase during a first portion of the open switch interval but to decrease during the second portion as indicated by the dotted line portion 51 of waveform 50 of FIG. 2*a*. Thus, the voltage at time $T_2$ is reduced to compensate for the higher direct current operating potential.

Conversely, with a decrease in operating potential, the energy supplied by capacitors 33 and 34 to deflection winding 27 and transformer 29 decreases with a corresponding decrease in amplitude of the positive retrace pulse developed across winding 29*c*. The decreased amplitude signal causes transistor 40 to conduct less current through control winding 41*a* which results in an increased inductance of the winding 15*a*–41*b* combination. This changes the resonant frequency of the commutating network including winding 15*a* and capacitors 33 and 34 such that the voltage at $T_2$ of waveform 50 is effectively increased, thereby maintaining constant energy for capacitors 33 and 34 as the supply voltage varies.

As can be seen from the waveform 50 of FIG. 2*b*, the switching voltage $V_1$ is maintained relatively constant by the regulator circuit but a much higher voltage $V_2$ is developed across the switch in its open condition. This is the voltage, $V_2$, which can cause breakdown of SCR 22 if it rises beyond the maximum breakdown voltage of the device.

FIG. 3 is a regulator circuit embodying the invention which is useful in conjunction with the deflection system of FIG. 1. The terminals A, B, and C of FIG. 3 are understood to be connected to the terminals A, B, and C of FIG. 1 after the circuitry to the left of these letters in FIG. 1 has been removed. In FIG. 3 the AC input voltage is rectified and filtered by the power supply comprising current limiting resistor 10, rectifying diode 11, filter capacitor 12, smoothing resistor 13, and a second filter capacitor 14. Current from this supply is coupled through a resistor 60, a winding 61 of a reactor, and through a winding 68*a* of an input choke 68 to the commutating switch 21 at terminal B. FIG. 3 differs from FIG. 1 generally in that a resonant network comprising winding 61 and a capacitor 67 connected between winding 61 and ground is included. The direct current from the power supply will charge capacitor 67 which will then discharge through input choke winding 68*a* when the commutating switch 21 is closed.

Figure 4:
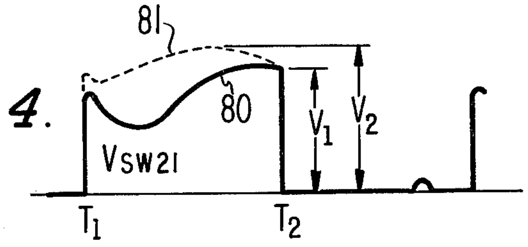
FIG. 4 is a diagram illustrating a waveform obtained in the circuit of FIG. 3.

The values of inductance 61 and capacitor 67 are selected such that the phase of the voltage across capacitor 67 is substantially opposite to the phase of the open switch commutating voltage waveform developed across commutating switch 21. This latter waveform is indicated by waveform 50 in FIG. 2*a*. Thus, the voltage developed in the series resonant network 61 and capacitor 67 subtracts from the peak voltage developed across commutating switch 21 and effectively lowers this voltage from what it was in FIG. 2*a*. The voltage waveform across commutating switch 21 with the deflection circuit utilizing the regulator circuit of FIG. 3 is illustrated by the waveform 80 in FIG. 4. The switching voltage $V_1$ at time $T_2$ remains substantially as it was in the FIG. 1 embodiment for this voltage is necessary to supply the desired energy to capacitors 33 and 34. However, because the peak voltage across the switch at times in the commutating interval $T_1$–$T_2$ is considerably less than it was with the circuit of FIG. 1, the chances of the SCR's breaking down in the deflection circuit are considerably reduced.

Regulation of the improved circuit in FIG. 3 is achieved much the same as it was in the circuit of FIG. 1. In FIG. 3, terminal A is coupled through a control winding 63*b* of a saturable reactor 63 and an energy recovery diode 66 to the +V potential source. A winding 63*a* of reactor 63 is coupled in parallel with reactor winding 61 through the parallel combination of a resistor 65 and an energy recovery diode 64. As in FIG. 1, as the current in control winding 63*b* increases or decreases in response to conduction of the regulator transistor amplifier stage 40, the inductance of the parallel combination of windings 63*a* and 61 decreases or increases, respectively. This changes the resonance of the series circuit comprising winding 61 and capacitor 67 and, accordingly, changes the phase of the voltage across capacitor 67. This in turn adds or subtracts from the nominal phase of the charging voltage waveform which is combined with the commutating switch voltage waveform and hence maintains regulation of the switching voltage at time $T_2$.

A winding 68*b* of reactor 68 in FIG. 3 provides a voltage waveform which is coupled to terminal C to be shaped and applied as a gate signal for trace SCR 25.

A permanent magnet 62 is disposed adjacent the reactor 61 to magnetically bias the reactor to offset the flux produced by the direct current through winding 61. This insures a central location of the operating point of the reactor within its hysteresis loop to insure a maximum regulating energy for power supply voltages which increase and decrease. A resistor 60 serves as an impedance matching resistor to match the resonant circuit with the output impedance of the power supply.

Figure 5:
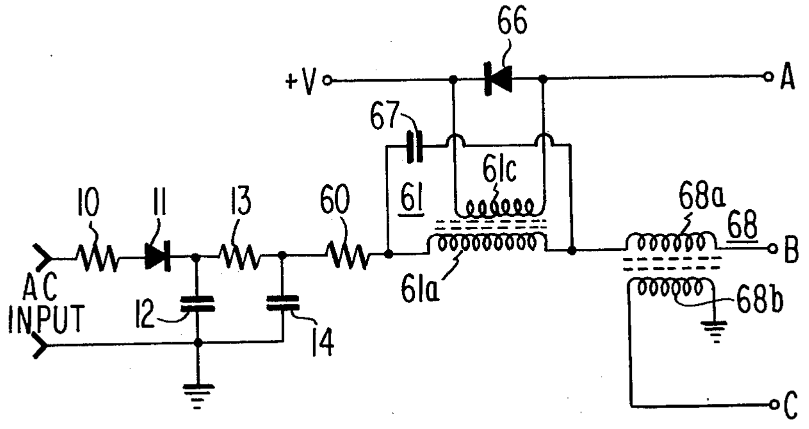
FIG. 5 is a second embodiment of a regulator circuit according to the invention and useful in conjunction with the deflection system of FIG. 1.

FIG. 5 is a second embodiment of a regulator circuit according to the invention and useful in conjunction with the deflection system of FIG. 1. The terminals A, B, and C are to be connected to the circuit of FIG. 1 similar to the arrangement described in FIG. 3. Those components in FIG. 5 which perform the same function as the corresponding circuit elements in FIG. 3 bear the same reference numerals.

In FIG. 5 the resonant circuit disposed between the power supply and the input choke 68 comprises a parallel resonant network of a capacitor 67 and reactor winding 61*a*. This resonant circuit performs the same function as its counterpart in FIG. 3, i.e., the charging of capacitor 67 through the network during each deflection cycle producing a voltage which has such a phase that when added to the commutating switch voltage maintains the switching voltage at time $T_2$ relatively constant but reduces the peak voltage appearing at other times across the commutating switch.

In FIG. 5 the regulator control current from terminal A is directed through a control winding 61*c* of reactor 61 to the +V supply source. Increases or decreases of regulator transistor 40 current through winding 61*c* decreases or increases, respectively, the inductance of winding 61*a*. This varies the resonant frequency of the network comprising reactor winding 61*a* and capacitor 67 and hence changes the phase of the voltage added to the commutating switch voltage. Waveform 80 of FIG. 4 and the dotted line portion 81 illustrate two extremes of commutating switch voltage during low and high supply voltage conditions, respectively. Comparing the waveform of FIG. 4 with the waveform of FIG. 2*b*, it can be seen that the maximum voltage developed across the commutating switch 21 is considerably reduced when the regulator according to FIG. 5 (or FIG. 3) is utilized. Although not shown, it should be understood that a bias magnet may be used with reactor 61 similar to the arrangement of magnet 62 in FIG. 3.

Figure 6:
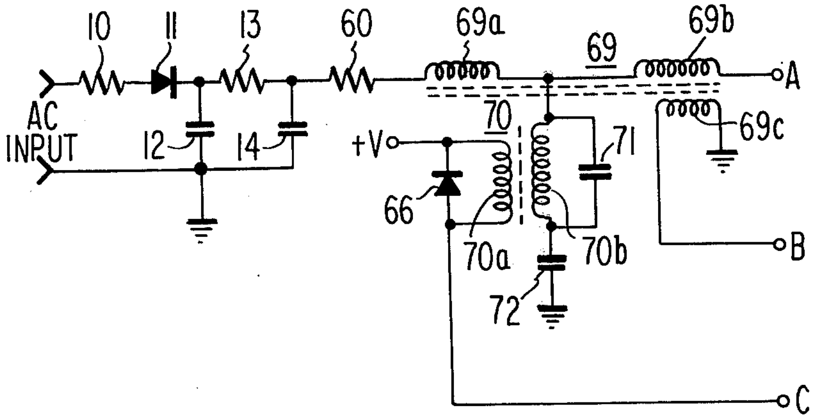
FIG. 6 is a third embodiment of a regulator circuit according to the invention and useful in conjunction with the deflection system of FIG. 1.

FIG. 6 is a third embodiment of a regulator circuit according to the invention and useful in conjunction with the deflection system of FIG. 1. Those circuit elements in FIG. 6 which perform the same function as the corresponding elements in FIGS. 3 and 5 are labelled with the same reference numerals.

In FIG. 6 the resonant circuit comprises reactor winding 70*b* of a saturable reactor 70 and a parallel connected capacitor 71. This network is coupled from the junction of input choke windings 69*a* and 69*b* through a DC blocking capacitor 72 to ground. In this embodiment, direct current from the power supply to the input choke does not flow through the reactor 70 and it is unnecessary to magnetically bias the reactor to achieve the greatest operating range. The resonant circuit comprising reactor winding 70*b* and capacitor 71 is charged from the direct current supply through matching resistor 60 and winding 69*a* of input choke 69. Winding 69*a* could be eliminated if the value of resistor 60 was chosen large enough. However, this would result in undesirable dissipation across resistor 60, so the additional winding 69*a* is used to achieve impedance matching. The voltage appearing across this circuit is added to the commutating voltage at point B to decrease the peak voltage appearing across commutating switch 21*b* at times other than the switching time $T_2$.

Similar to the arrangement in the other embodiments, control of the regulation is achieved by causing the current through reactor control winding 70*a* to increase or decrease producing a corresponding decrease or increase in the inductance of winding 70*b*. This changes the resonance of the circuit comprising winding 70*b* and capacitor 71 and hence changes the phase of the voltage which is added to the commutating switch voltage.

What is claimed is:

1. A voltage regulator for a deflection circuit including a commutating switch for causing transfer of energy to a commutating network during a first portion of each deflection cycle for supplying energy to a deflection winding during a second portion of each deflection cycle, said regulator comprising:

a direct current voltage source;

first inductance means coupled to said commutating switch;

second variable inductance means coupled to said first inductance means and to said source of direct current voltage;

capacitance means coupled to said second inductance means to form a resonant circuit therewith for coupling energy from said direct current voltage source to said first inductance means;

a source of undesirable voltage variations in said deflection circuit; and means coupled to said source of voltage variations and to said second variable inductance means and responsive to said voltage variations for varying the inductance of said second inductance means for changing the phase of said energy coupled to said first inductance means for maintaining substantially constant energy in said commutation network from one deflection cycle to another.

2. A voltage regulator according to claim 1 wherein said second inductance means is serially coupled between said first inductance means and said direct current voltage source and said capacitance means is coupled between the junction of said first and second inductance means and a point of reference potential for forming a series resonant circuit with said second inductance means.

3. A voltage regulator according to claim 1 wherein said second inductance means is serially coupled between said first inductance means and said direct current voltage source and said capacitance means is coupled in parallel with said second inductance means for forming a parallel resonant circuit therewith.

4. A voltage regulator according to claim 1 wherein said second inductance means is coupled between the junction of said first inductance means and said direct current voltage source and a point of reference potential and said capacitance means includes a first capacitance coupled in parallel with said second inductance means for forming a parallel resonant circuit therewith and a second capacitance serially coupled with said second inductance means between said junction and said point of reference potential for blocking direct current in said second inductance means.

5. A voltage regulator according to claim 1 wherein said second inductance means includes a winding magnetically coupled thereto, said winding being coupled to said means responsive to said voltage variations such that the amount of inductance of said second inductance is varied in response to current variations in said winding caused by said voltage variations.

6. A voltage regulator according to claim 5 wherein an impedance matching means is coupled between said source of direct current and said second inductance means.

7. A voltage regulator according to claim 5 wherein said second inductance means includes a magnetic biasing means for causing magnetic flux in said second inductance means for opposing magnetic flux produced by direct current from said direct current voltage source traversing said second inductance means.

8. A voltage regulator according to claim 5 wherein unidirectional current conducting means are coupled in circuit with said second inductance means for blocking direct current from said direct current voltage source from traversing said second inductance means.

* * * * *